(12) United States Patent
Hong

(10) Patent No.: US 9,740,400 B2
(45) Date of Patent: *Aug. 22, 2017

(54) ELECTRONIC DEVICE AND METHOD FOR CHARACTER DELETION

(71) Applicant: BlackBerry Limited, Waterloo (CA)

(72) Inventor: Yoojin Hong, Palo Alto, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 511 days.

This patent is subject to a terminal disclaimer.

(21) Appl. No.: 14/495,229

(22) Filed: Sep. 24, 2014

(65) Prior Publication Data

US 2015/0012874 A1    Jan. 8, 2015

Related U.S. Application Data

(63) Continuation of application No. 13/247,834, filed on Sep. 28, 2011, now Pat. No. 8,856,674.

(51) Int. Cl.
*G06F 3/00* (2006.01)
*G06F 3/0488* (2013.01)
*G06F 3/0484* (2013.01)

(52) U.S. Cl.
CPC ...... *G06F 3/04886* (2013.01); *G06F 3/04842* (2013.01)

(58) Field of Classification Search
CPC .................. G06F 3/04886; G06F 3/04842
See application file for complete search history.

(56) References Cited

U.S. PATENT DOCUMENTS

| 6,326,952 B1 | 12/2001 | Amro et al. |
| 7,205,982 B1 | 4/2007 | Kurosawa et al. |
| 8,059,101 B2 | 11/2011 | Westerman et al. |
| 8,856,674 B2 | 10/2014 | Hong et al. |
| 2003/0011495 A1 | 1/2003 | Trell |

(Continued)

FOREIGN PATENT DOCUMENTS

EP    2660699    11/2013

OTHER PUBLICATIONS

Malik et al., Virtual touchpad: a two-handed gesture input device; © 2004; ACM; 8 pages.*

(Continued)

*Primary Examiner* — Linh K Pham
(74) *Attorney, Agent, or Firm* — Fish & Richardson P.C.

(57) ABSTRACT

A method performed on an electronic device for character deletion is described. The electronic device has a virtual keyboard including a plurality of virtual keys organized in accordance with a keyboard layout, with each key in a position according to the layout, and the plurality of virtual keys includes a first virtual key. The method for character deletion includes associating a first virtual key of a virtual keyboard with a delete function for deleting characters; determining a language associated with the virtual keyboard; determining a customary direction in which the language is read; and updating the first virtual key to: perform, when selected, a delete function that operates in a particular operating direction based on the customary direction; and display an indicator of the particular operating direction.

9 Claims, 5 Drawing Sheets

(56) References Cited

U.S. PATENT DOCUMENTS

| | | | |
|---|---|---|---|
| 2004/0021681 A1* | 2/2004 | Liao | G06F 1/1616 715/702 |
| 2004/0036632 A1 | 2/2004 | Ford | |
| 2007/0041540 A1 | 2/2007 | Shao et al. | |
| 2008/0106440 A1 | 5/2008 | Verma et al. | |
| 2008/0316183 A1 | 12/2008 | Westerman et al. | |
| 2009/0044139 A1 | 2/2009 | Shin et al. | |
| 2009/0225041 A1 | 9/2009 | Kida et al. | |
| 2010/0060585 A1 | 3/2010 | Chiu | |
| 2010/0214267 A1 | 8/2010 | Radivojevic et al. | |
| 2010/0231523 A1 | 9/2010 | Chou | |
| 2011/0050576 A1 | 3/2011 | Forutanpour et al. | |
| 2011/0077054 A1 | 3/2011 | Yamasaki | |
| 2011/0078567 A1 | 3/2011 | Kim et al. | |
| 2011/0078636 A1 | 3/2011 | Jeon et al. | |
| 2011/0221678 A1 | 9/2011 | Davydov | |
| 2011/0285656 A1 | 11/2011 | Yaksick et al. | |
| 2012/0005615 A1* | 1/2012 | Gruber | G06F 3/03547 715/773 |

OTHER PUBLICATIONS

VMWare Knowledge Base, "Tips on using a Macintosh keyboard," http://kb.vmware.com/kb/1001675, Jun. 28, 2011, 5 pages.

uControl, "Giving you control of your keyboard since 10.0.1," http://gnufoo.org/ucontrol/, 2003, 9 pages.

Extended European Search Report in corresponding European Application No. 11185121.8-2224, mailed by the European Patent Office on Jan. 31, 2012 (9 pages).

Knight, "30 Top Ma User Mistakes: How Many are Apples Fault?" Apr. 30, 2007. Retrieved from the internet http://lowendmac.com/musings/07/0430.html (retrieved on Jan. 19, 2012) (7 pages).

Schwartz, "Hebrew Keyboard for iPhone Mail Client," Nov. 25, 2008. Retrieved from the Internet: http://www.cartoonbarry.com/2008/11/Hebrew_keyboard_for-iphone_mai.html (retrieved on Jan. 19, 2012) (4 pages).

International Search Report and Written Opinion in corresponding International Application No. PCT/US2011/053757, mailed by the International Searching Authority on Feb. 2, 2012 (15 pages).

Combined Search and Examination Report under Sections 17 and 18(3), in corresponding British Application No. GB1217392.8, mailed by the British Intellectual Property Office on Jan. 30, 2013 (12 pages (two copies)).

Communication Pursuant to Article 94(3) EPC, in corresponding European Application No. 11 185 121.8-1960, mailed by the European Patent Office on Jun. 10, 2013 (10 pages).

Summons to Attend Oral Proceedings Pursuant ot Rule 115(1) EPC, issued by European Patent Office, mailed Apr. 8, 2014, in European Patent Application No. 11185121.9-1972/2575005 (5 pages).

Examination Report under Section 18(3), issued by British Intellectual Property Office, mailed Oct. 22, 2013 in British Application No. GB1217392.8 (6 pages (two copies)).

Hearing Decision, issued by British Intellectual Property Office, mailed Apr. 24, 2014, in British Application No. GB1217392.8 (7 pages).

Sharma et al., Parameters Effecting the Predictive Virtual Keyboard, copyright 2010; IEEE; 8 pages.

"Right-to-left language features," Microsoft Office Documentation, <http://office.microsoft.com/en-us/outlookhelp/right-to-left-language-features-HA010354392.aspx?CTT=5&origin=HA010361027>; 3 pages.

Examination Report issued in Canadian Application No. 2,791,486 on Jul. 8, 2014; 5 pages.

* cited by examiner

ELECTRONIC DEVICE AND METHOD FOR CHARACTER DELETION

CROSS-REFERENCE TO RELATED PATENT APPLICATIONS

This application is a continuation of U.S. patent of application Ser. No. 13/247,834, filed Sep. 28, 2011, which is incorporated herein by reference.

FIELD OF TECHNOLOGY

The present disclosure relates to electronic devices including, but not limited to, portable electronic devices and their control.

BACKGROUND

Electronic devices, including portable electronic devices, have gained widespread use and may provide a variety of functions including, for example, telephony, text messaging, web browsing, or other personal information manager (PIM) functions such as a calendar application. Portable electronic devices include several types of devices such as cellular telephones (mobile phones), smart telephones (smart phones), Personal Digital Assistants (PDAs), tablet computers, or laptop computers, with wireless network communications or near-field communications connectivity such as Bluetooth® capabilities.

Portable electronic devices such as smart phones, tablet computers, or PDAs are generally intended for handheld use due to their small size and ease of portability. A touch-sensitive input device, such as a touchscreen display, is particularly desirable on handheld devices, which are small and may have limited space for user input or output devices. Improvements in electronic devices with displays are desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
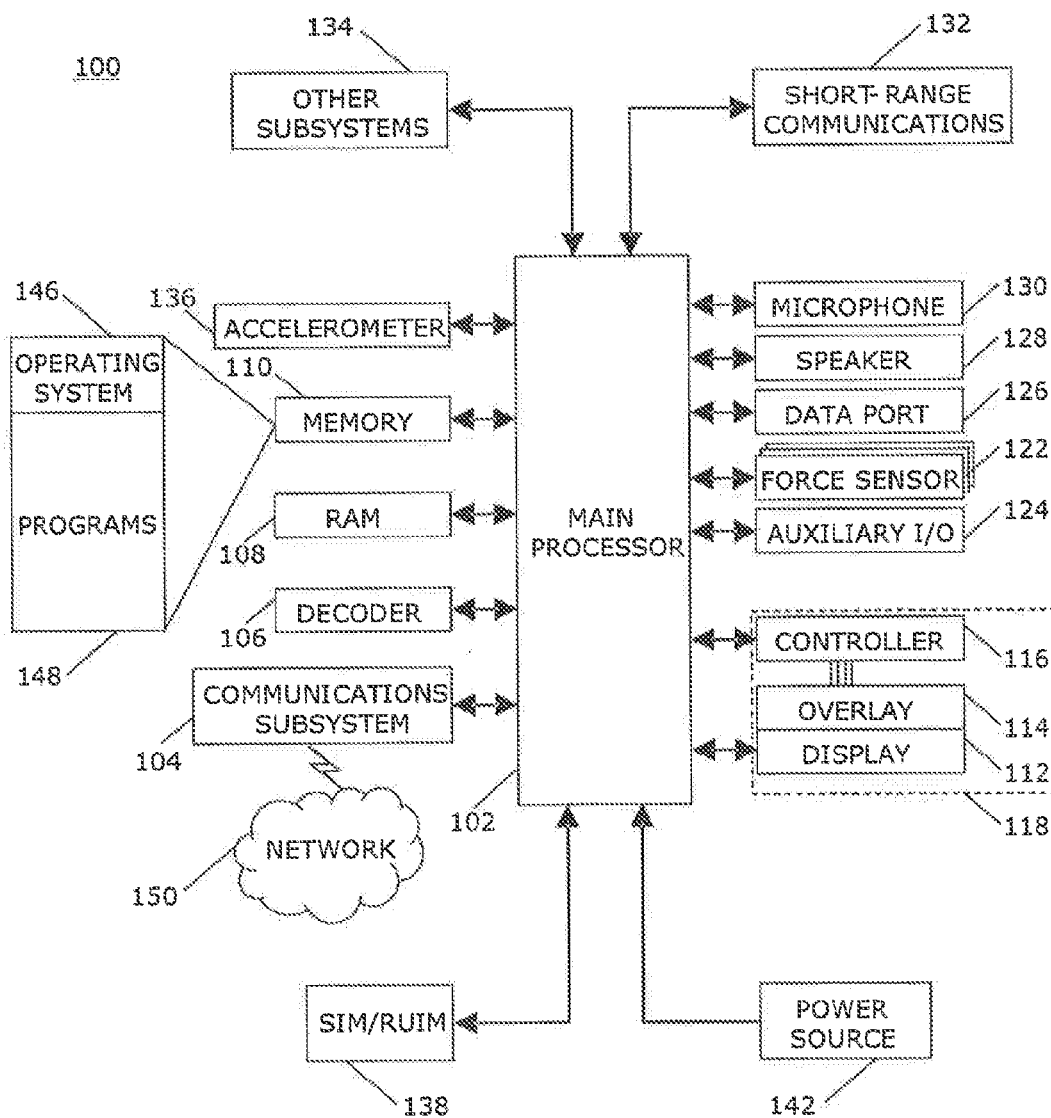
FIG. 1 is a block diagram of an example of a portable electronic device in accordance with the present disclosure.

The following describes an electronic device and keyboard therefor, and a method performed on an electronic device, the electronic device having a keyboard comprising a plurality of keys including a first key, and direction identifier indicia associated with the first key configured to selectively display direction of a position indicator, the method comprising: associating the first key with a first function; displaying a first direction of the position indicator for the first function; and responsive to receiving a selection of a second function, associating the first key with the second function; and displaying a second direction of the position indicator for the second function.

According to one example, a keyboard for an electronic device is provided, the keyboard comprising a plurality of keys including a first key having a first function and a second function associated therewith; and direction identifier indicia associated with the first key, the direction identifier indicia configured to selectively indicate a first direction of a position indicator for the first function, and a second direction of the position indicator for the second function.

According to another example, a method performed on an electronic device is provided, the electronic device having a keyboard comprising a plurality of keys including a first key, and direction identifier indicia associated with the first key configured to selectively display direction of a position indicator, the method comprising: associating the first key with a first function; displaying a first direction of the position indicator for the first function; and responsive to receiving a selection of a second function, associating the first key with the second function; and displaying a second direction of the position indicator for the second function.

According to yet another example, an electronic device is provided, the electronic device comprising: a display; a keyboard having a plurality of keys including a first key, the first key having a first function and a second function associated therewith; and direction identifier indicia associated with the first key configured to selectively display direction of a position indicator; a processor coupled to the display, the processor configured to perform the following steps: displaying a first direction of the position indicator for the first function; and responsive to receiving a selection of a second function, displaying a second direction of the position indicator for the second function.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the example embodiments described herein. The description is not to be considered as limited to the scope of the example embodiments described herein.

The disclosure generally relates to an electronic device, such as a portable electronic device. Examples of portable electronic devices include wireless communication devices such as cellular telephones (mobile phones), smart telephones (smart phones), pagers, PDAs, tablet computers, laptop computers, notebook computers, netbook computers, and so forth, with wireless communications capabilities. The portable electronic device may also be a portable electronic device without wireless communications capabilities. Examples include handheld electronic game devices, digital photograph albums, digital cameras, gaming consoles, or similar devices.

To enhance portability of portable electronic devices, there is a trend to minimize the amount of real estate dedicated to input devices and instead maximize the display area available to present content. Often, input devices such as keys having similar functionalities are consolidated to economize real estate. As a result, the keyboards available on portable electronic devices often do not have a delete key that is distinct from the backspace key. Although the functionality of a delete key may be enabled by simultaneous pressing of the alt and the backspace keys on some portable electronic devices, the character deletion direction is not made apparent to the user. Moreover, the indicia associated with the delete key to indicate the character deletion direction does not adapt to the character input direction of the current language of the keyboard. The present disclosure seeks to overcome these deficiencies by providing direction identifier indicia that selectively indicate the direction of movement the position indicator on the display of the portable electronic device for either the delete function or the backspace function, in accordance with the current operating language of the keyboard.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communications subsystem 104 and a short-range communications 132 module to perform various communication functions, including data and voice communications. Data received by the portable electronic device 100 is decompressed and decrypted by a decoder 106. The communications subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 is coupled to and interacts with other components, such as Random Access Memory (RAM) 108, memory 110, a display 112. In the example embodiment of FIG. 1, the display 112 is coupled to a touch-sensitive overlay 114 and an electronic controller 116 that together comprise a touch-sensitive display 118. The processor is also coupled to one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 to detect direction of gravitational forces or gravity-induced reaction forces so as to determine, for example, the orientation of the portable electronic device 100.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communications subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communications subsystem 104, for example.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. When a touch begins, one or more signals are provided to the controller 116 and the origin of the touch may be determined from the signals. The origin may be a point or an area, for example. Signals may be provided to the controller 116 at regular intervals in time for a touch, also known as sampling, such that changes in location of the touch may be detected. A touch may be detected from any suitable input member, such as a finger, thumb, appendage, or other objects, for example, a stylus, pen, or other pointers, depending on the nature of the touch-sensitive display 118. Multiple simultaneous touches may be detected.

One or more gestures are touches that are also detected by the touch-sensitive display 118. A gesture, such as a swipe, also known as a flick, is a particular type of touch on a touch-sensitive display 118 that begins at an origin point and continues to an end point. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A hover may be a touch at a location that is generally unchanged over a period of time or is associated with the same selection item for a period of time. The controller 116 and/or the processor 102 can receive a touch or gesture from any suitable input member on the touch-sensitive display 118.

In some example embodiments, optional one or more force sensors 122, are disposed in any suitable location(s), for example, between the touch-sensitive display 118 and a back of the portable electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, such as, cancel or unlock; function buttons, such as play or stop on a music player; and so forth. Different magnitudes of force may be associated with different functions or input. For example, a lesser force may result in panning, and a higher force may result in zooming.

Figure 2:
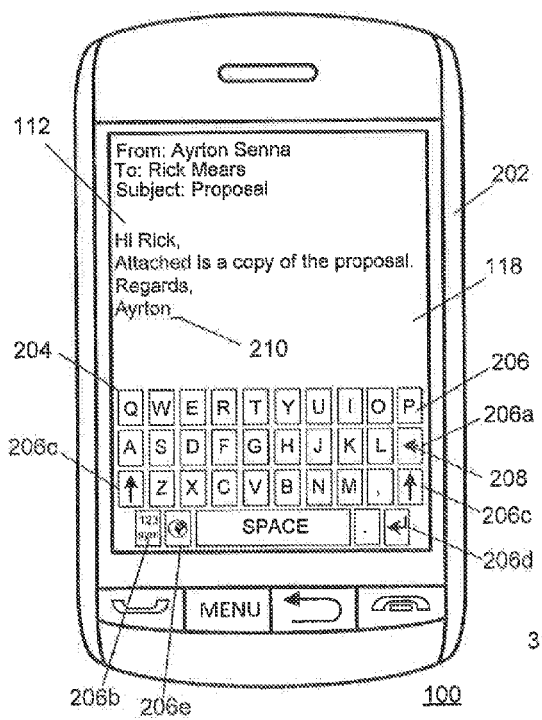
FIG. 2 is a front view of an example of a portable electronic device having a virtual keyboard rendered on the display of the portable electronic device in accordance with the present disclosure.

A front view of an example of the portable electronic device 100 is shown in FIG. 2. The portable electronic device 100 includes a housing 202 in which the touch-sensitive display 118 is disposed. The housing 202 is an enclosure that contains components of the portable electronic device 100, such as the components shown in FIG. 1.

A keyboard 204 may be a physical keyboard received within the housing 202, or a virtual keyboard rendered as a GUI displayed on the touch-sensitive display 118 as illustrated by the example embodiment of FIG. 2. As shown in FIG. 2, the keyboard 204 is a GUI rendered on the touch-sensitive display 118 and has a QWERTY keyboard layout. In alternate example embodiments, other keyboard layouts such as QWERTZ, AZERTY, Dvorak, or the like, may be utilized. Similarly, reduced keyboards having two or more characters associated with certain keys, such as a reduced QWERTY keyboard layout, can be contemplated. For example, a reduced QWERTY keyboard may be provided in which the letters Q and W share a single key, the letters E and R share a single key, and so forth.

The keyboard 204 includes a plurality of keys 206 that are rectangular. However, keys of other shapes such as oval keys can be contemplated. In some embodiments, the keys 206 are spaced apart by a small spacing that is less than the width of the keys 206. Each one of the keys 206 is associated with at least a character or a function as indicated by indicia displayed thereupon.

In the example illustrated in FIG. 2, the keys 206 are associated with alphanumeric characters including the letters of the alphabet and numbers (not shown); and special characters (not shown), such as "@", "#", "$", and "*"; as well as punctuation marks including the period, and a space. Other keys 206 are associated with functions including a backspace key 206a for backspace function having direction identifier indicia 208 (depicted by left and right pointers in the example embodiments herein), alt key 206b, shift keys 206c, globe key 206e, and return key 206d.

In the example embodiment of FIG. 2, alternate functions or characters are enabled by simultaneously selecting the alt key 206b and the keys 206 associated with the function or character. For example, the delete function is enabled by simultaneously touching the aft key 206b and the backspace key 206a. Similarly, numbers and special characters are rendered by selecting the of key 206b and any one of the keys 206 associated with the number or special character. In the presently described embodiment, touching the alt key 206b causes the keyboard 204 to display the indicia for the alternate character or function associated with any of the keys 206.

The keyboard 204 may be rendered in any suitable program or application such as a web browser, text messaging (such as an email client), contacts, calendar, music player, spreadsheet, word processing, operating system interface, and so forth for text input. Other information such as text, characters, symbols, images, and other items may also be displayed, for example, as the virtual keyboard 204 is utilized for data entry.

The keys 206 each provide a target area to receive touch input for a selectable feature such as characters or functions on the touch-sensitive display 118 of the portable electronic device 100. When a touch is detected within a touch location on the touch-sensitive display 118 that corresponds to one of the selectable features associated with any of the keys 206, the character or function associated with the key is received. Accordingly, during text input, a user of the portable electronic device 100 can input characters to compose text in an application by touching the target areas for the character keys 206.

The keyboard 204 that is rendered on the touch-sensitive display 118 is associated with a keyboard language that is set at the portable electronic device 100 and may be, for example, an English keyboard, a French Keyboard, a Spanish Keyboard, an Arabic Keyboard, a Hebrew keyboard, or a keyboard 204 in any other language available by the portable electronic device 100. Keyboards of different languages are accessible by selecting the globe key 206e. Upon receiving a touch at a touch location associated with the globe key 206e, a list of keyboards available in alternate languages is provided. In some embodiments, the globe key 206e displays an abbreviation indicator (for example, indicia such as EN for an English keyboard, FR for a French keyboard, or ES for a Spanish keyboard, etc.) to indicate the language of the keyboard 206 currently being rendered.

As shown in FIG. 2, a position indicator 210 such as a cursor is provided on the display 112. The position indicator moves on display 112 according to the direction of character input for the current keyboard language when the portable electronic device 100 is in the text input mode of operation. The position indicator 210 is generally displayed after the last input character. However, the position indicator 210 can be placed at a position before or after any character displayed by touching the touch-sensitive display 118 at a touch location. Accordingly, characters are input in a forward direction (i.e. direction of character input) of the keyboard language in the text input mode of operation, and deleted in the backward direction (i.e. direction of character deletion) of the keyboard language when in the text deletion mode of operation.

During text input, the input characters are displayed on the display 112 in the direction of the position indicator 210 for the current language of the keyboard 204, which can be either horizontally (left-to-right or right-to-left) or vertically (up or down). For example, for keyboard languages based on Latin characters such as the English keyboard of FIG. 2, the position indicator 210 moves in a direction from the left to the right of display 112 of the portable electronic device 100 each time a character is entered and subsequently displayed on the display 112. Accordingly, English characters are displayed on display 112 from left-to-right. However, for languages wherein text is conventionally input from right-to-left, such as Hebrew or Arabic keyboards, the position indicator 210 moves in the character input direction right-to-left. As a result, the displayed characters are rendered from right-to-left with respect to display 112.

Figure 3:
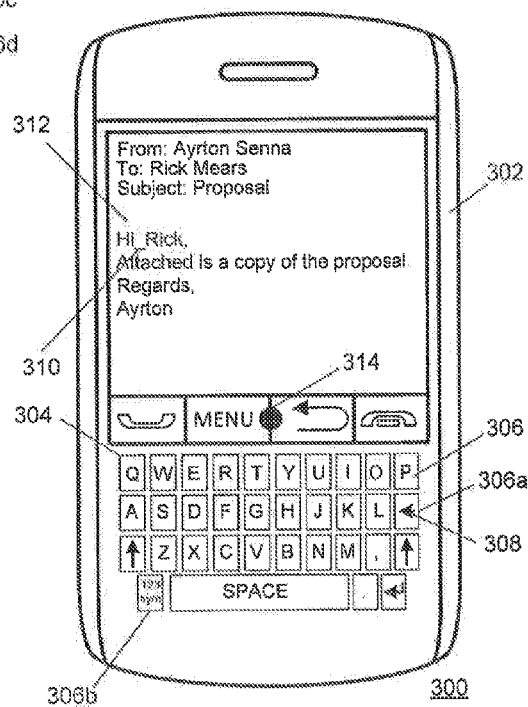
FIG. 3 is a front view of another example of a portable electronic device having a physical keyboard in accordance with the present disclosure.

Reference is now made to FIG. 3, which shows another example portable electronic device 300 having a physical keyboard 304 received within the housing 302. In the example embodiment of FIG. 3, the physical keyboard 304 is positioned underneath the display 312. In alternate embodiments, the keyboard 304 is positioned at a side of display 312, or is slidable over or under the display 312. The keyboard 304 includes keys 306 each having a mechanical actuator such as a dome switch actuator. In this example embodiment, a character or function associated with any one of keys 306 is received when the dome collapses due to imparted force on the key when the key is pressed. The dome returns to the rest position after release of the key. The keyboard 304 is coupled to processor 102 (shown in FIG. 1) for receiving and processing character or function inputs. Keys 306 including other types of mechanical actuators, such switches depressible to bring a key contact into electrical engagement with an opposing contact to make an electric connection corresponding to selection of a particular key, or the like, are contemplated in other example embodiments. In some embodiments, a separate keyboard controller (not shown) is coupled to the keyboard 304 and communicates character or function inputs to the processor 102.

In the example embodiment of FIG. 3, alphanumeric characters including the letters of the alphabet and numbers, special characters, and punctuation marks are associated with keys 306. Some keys 306 are also associated with functions, such as the backspace key 306a having direction identifier indicia 308 showing the character deletion direction of a position indicator 310, and the alt key 306b. In the example embodiment of FIG. 3, alternate functions or characters are enabled by simultaneously pressing the alt key 306b and the keys 306 associated with the function or character. Accordingly, the delete function is enabled by simultaneously pressing the alt key 306b and the backspace key 306a. In a similar fashion, numbers and special characters are rendered by selecting the alt key 306b and any one of the keys 306 associated with the number or special character for input.

The keys 306 each have indicia displayed thereupon to indicate the character or function associated therewith. Pressing the alt key 306b causes the indicia for the alternate character or function associated with any of the keys 306 to be displayed. The backspace key 306a has direction identifier indicia 308 that can be selectively illuminated to display the direction of movement of the position indicator 310 for the currently operating keyboard language. In the example embodiment of FIG. 3, some of the keys 308, including the backspace key 306a, are selectively illuminated by a light source (not shown) inside the housing 302. A backlight controller (not shown) is coupled to the light source for the backspace 306a key. This backlight controller is configured to control the light source to selectively illuminate the direction identifier indicia 308 on the backspace key 306a to show different directions for position indicator 310. In other embodiments, the indicia associated with keys 306 can be selectively displayed by using optical waveguides, light-emitting diodes (LEDs), or the like.

The portable electronic device 300 of FIG. 3 also includes an input navigation device 314 to move the position indicator 310 in the display 312. In the presently described example embodiment, the input navigation device 314 is an optical trackpad. However, other input navigation devices such as an omnidirectional pad, jogball, trackball, omnidirectional joystick, thumbwheel, trackpad, touchpad, or the like, can be contemplated.

Character deletion is further described in connection with in FIGS. 4A, 4B and 5A, 5B, characters can be deleted by selection of the backspace key (i.e. backspace function), or the alt key and the backspace key together (i.e. delete function). The direction identifier indicia selectively indicate the directions of position indicator for deletion of a character for either the backspace function or the delete function. In some example embodiments, a touch-and-hold gesture deletes multiple characters until the hold is released.

Figure 4B:
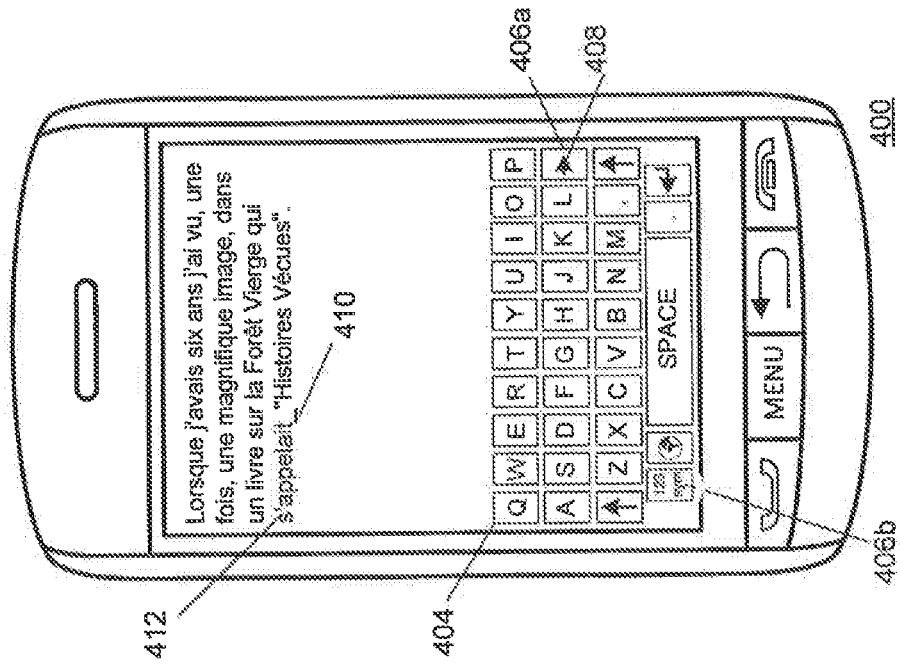
FIGS. 4A and 4B are front views of an example of a portable electronic device having a French keyboard in accordance with the present disclosure.
Figure 4A:
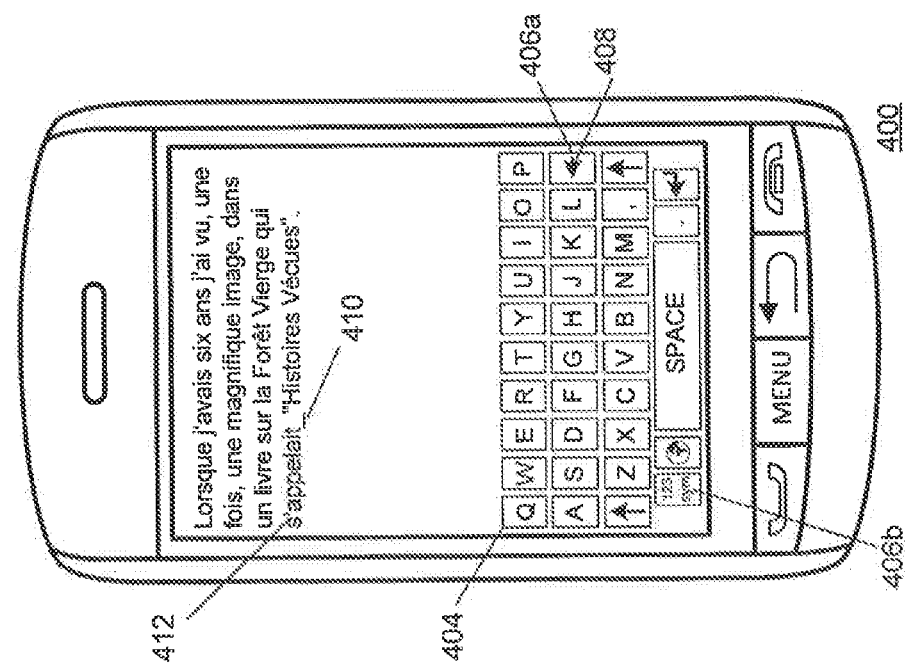

Referring first to FIG. 4A, upon touching the backspace key 406a of the portable electronic device 400, characters are deleted and removed from the display 412 in a direction that is opposite of the direction of character input for current language of the keyboard 404. Accordingly, for a keyboard language such as the French keyboard 404 illustrated in FIG. 4A whereby the position indicator 410 moves from left-to-right when inputting characters, the direction identifier indicia 408 indicates that a character is removed in a right-to-left direction each time the backspace key 406a is touched. However, as shown in FIG. 4B, if the alt key 406b is enabled, the direction identifier indicia 408 points in a left-to-right direction to indicate the movement of the position indicator 410 for deletion of characters for the delete function. If the backspace key 406a is subsequently selected while the alt key 406b is being enabled (i.e. both keys 406a, 406b being contemporaneously touched), the delete function is thereby activated, and the position indicator 410 moves from left-to-right as characters are removed from display 412.

Figure 5B:
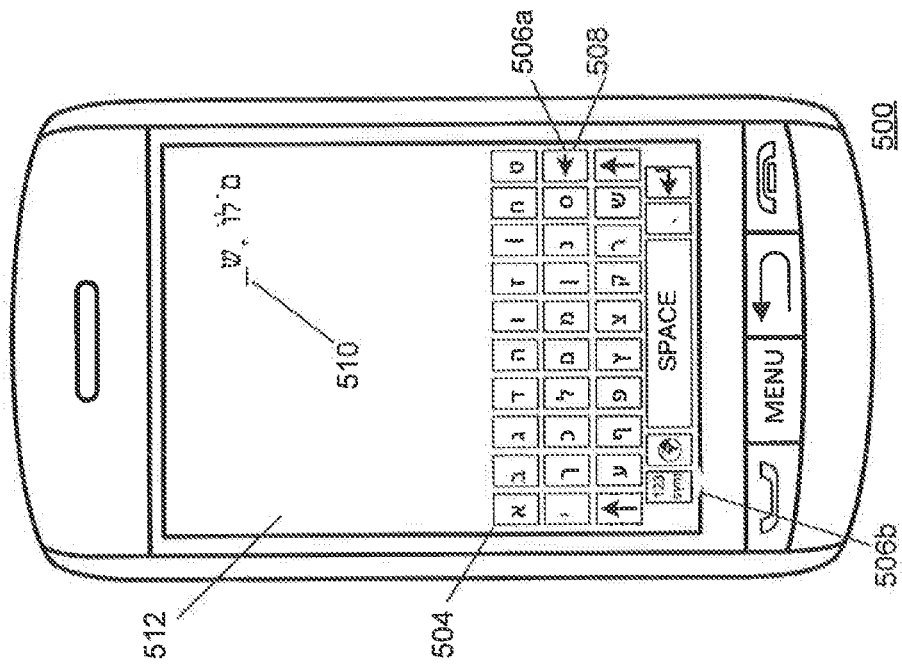
FIGS. 5A and 5B are front views of an example of a portable electronic device having a Hebrew keyboard in accordance with the present disclosure.
Figure 5A:
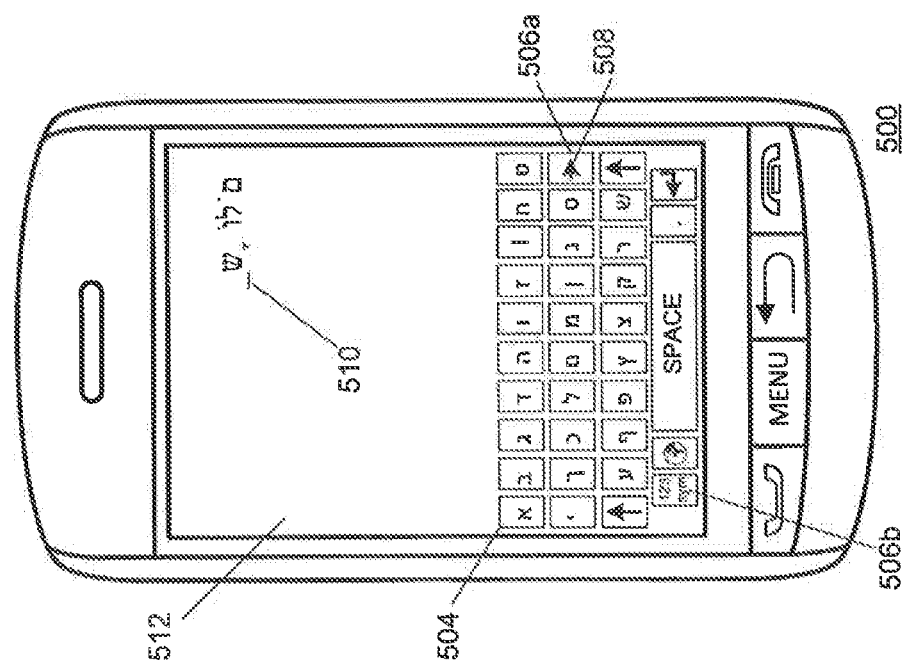

Referring now to FIG. 5A, the example Hebrew keyboard 504 of the portable electronic device 500 receives characters in the right-to-left direction during text input. Accordingly, the direction identifier indicia 508 points in a direction from left-to-right to indicate that when the backspace key 506a is touched, a character is removed and the position indicator 510 moves in a left-to-right direction on display 512. As shown in FIG. 5B, the direction identifier indicia 508 shows a direction of right-to-left movement when the alt key 506b is selected, to indicate that the combination of the alt key 506b and backspace key 506a when touched simultaneously results in the position indicator 510 moving from right-to-left as characters are being deleted in this direction.

Figure 6:
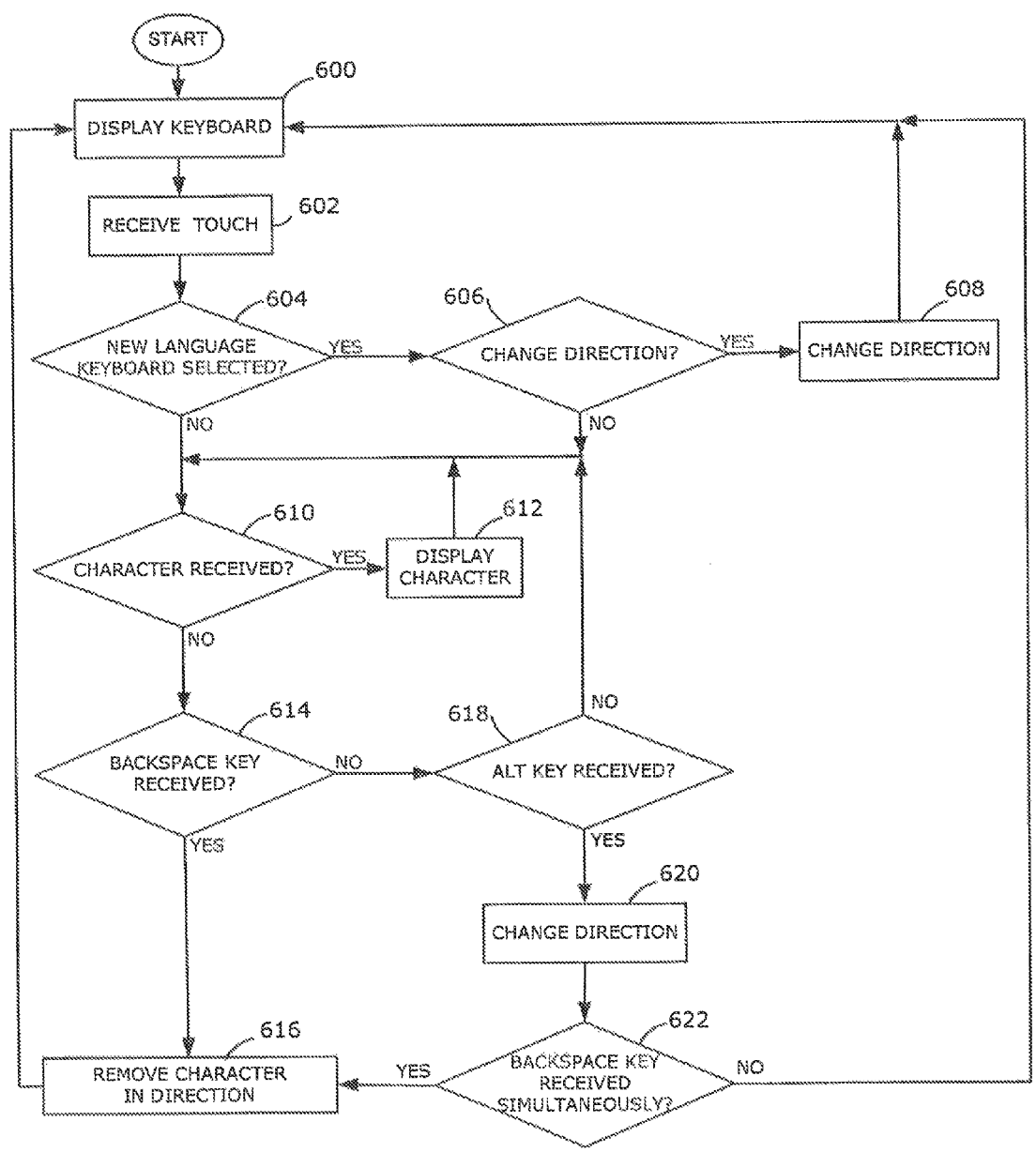
FIG. 6 is a flowchart illustrating a method for character deletion in accordance with the present disclosure.

A flowchart illustrating a method of character deletion at an electronic device is shown in FIG. 6. Although the method is described in connection with the example embodiment of FIG. 2, the method can be performed by any of the example embodiments described herein. The method may be carried out by software executed, for example, by the processor 102. Coding of software for carrying out such a method is within the scope of a person of ordinary skill in the art given the present disclosure. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

The method may be carried out in any suitable program or application in which characters, such as alphabetical, numerical, and symbolic characters, are input. Examples of suitable applications include email, text messaging, calendar, tasks, address book, map, Web browser, word processing, and so forth. Information from the application is displayed on the display 112 of the portable electronic device 100.

To input characters in a program or application being executed by the processor 102, a keyboard 204 having a plurality of keys 206 is displayed on the display 112 of the portable electronic device 100 at 600. When a touch at a touch location on the touch-sensitive display 118 is received at 602, the processor 102 assesses at 604 whether the selectable feature being touched corresponds to a selection of the globe key 206e for changing the language of the keyboard 204. If the globe key 206e was selected, a determination is made at 606 whether the direction of direction identifier indicia 208 should be changed to accord with the new language. In the affirmative, the direction of direction identifier indicia 208 is changed at 608 and the new keyboard is displayed at 600. If it is determined that no new language is being selected, or that the direction of direction identifier indicia 208 is not required to be changed, the method continues to step 610, wherein it is determined whether the touch location is associated with a selectable feature for a character. If a key corresponding to a character was received, the corresponding character is displayed on the display 112 of handheld electronic device 100 at 612. Otherwise, a determination is made whether the input at the touch location corresponds to selection of the backspace key 206a for backspace function at 614, in which case a character is removed from display 112 at 616, and the position indicator 210 moved in the direction of the direction identifier indicia 208 upon removal of the character.

However, if the input at the touch location is for selection of the alt key 206b at 618, the direction of the direction identifier indicia 208 is changed to a direction that is opposite of the direction of the direction identifier indicia 208 previously displayed at 620. Accordingly, the direction identifier indicia 208 previously displayed is discontinued from display, and replaced by direction identifier indicia 208 pointing in an opposite direction. Now if a backspace key 206a is received simultaneously while the alt key 206b was enabled at 622, the character is purged from display 112 at 616, with the position indicator 210 moving in the last direction of the direction identifier indicia 208 upon removal of the character.

The portable electronic device 100 is described to provide an example of one suitable electronic device. Many of the features or elements of the electronic device 100 described herein may be optional. Furthermore, the electronic device may also include other features that are not described herein and may differ in form.

It is noted that while the changing of the directions of position indicator 210 at 620 was described in connection with selection of the aft key 206b at 618, in other example embodiments, the position indicator 210 can change at 618 based on other events to access the alternate function associated with the backspace key 206a, such as, touching or hold-and-press of the backspace key 206a for a predefined duration, selecting a menu item, detecting a movement (for example by shaking) of the portable electronic device 100 by an orientation sensor such as an accelerometer 136, etc.

It is further noted that while the direction identifier indicia is depicted by left and right pointers in the current example embodiments, other shapes, and color combinations can be contemplated.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method performed on an electronic device having a virtual keyboard comprising a plurality of virtual keys organized in accordance with a keyboard layout, with each key in a position according to the layout, the plurality of virtual keys including a first virtual key, the method comprising:
    associating a first virtual key of a virtual keyboard with a delete function for deleting characters;
    determining a language associated with the virtual keyboard;
    determining a customary direction in which the language is read; and
    updating the first virtual key to:
        perform, when selected, a delete function that operates in a particular operating direction based on the customary direction, wherein the particular operation direction is an opposite direction of the customary direction in which the language is read; and
        display an indicator of the particular operating direction, wherein the indicator comprises an arrow, and the arrow indicates the articular operating direction of the delete function.

2. The method of claim 1, wherein the language is determined responsive to detecting a change in a setting of the virtual keyboard.

3. The method of claim 2, wherein the change is the setting is a user selection of the language for the virtual keyboard.

4. A system comprising:
    a display configured to display a virtual keyboard that having a plurality of virtual keys including a first virtual key;
    a processor; and
    a memory storing instructions that, when executed by the processor, cause the processor to:
        associate the first virtual key of the virtual keyboard with a delete function for deleting characters;
        determine a language associated with the virtual keyboard;
        determine a customary direction in which the language is read; and
        update the first virtual key to:
            perform, when selected, a delete function that operates in a particular operating direction based on the customary direction, wherein the particular operation direction is an opposite direction of the customary direction in which the language is read; and
            display an indicator of the particular operating direction, wherein the indicator comprises an arrow, and the arrow indicates the particular operating direction of the delete function.

5. The system of claim 4, wherein the language is determined responsive to detecting a change in a setting of the virtual keyboard.

6. The system of claim 5, wherein the change is the setting is a user selection of the language for the virtual keyboard.

7. A non-transitory computer-readable medium storing instructions that, when executed by a processor, cause the processor to perform a method comprising:
    associating the first virtual key of a virtual keyboard with a delete function for deleting characters;
    determining a language associated with the virtual keyboard;
    determining a customary direction in which the language is read; and
    updating the first virtual key to:
        perform, when selected, a delete function that operates in a particular operating direction based on the customary direction, wherein the particular operation direction is an opposite direction of the customary direction in which the language is read; and display an indicator of the particular operating direction, wherein the indicator comprises an arrow, and the arrow indicates the particular operating direction of the delete function.

8. The computer-readable medium of claim 7, wherein the language is determined responsive to detecting a change in a setting of the virtual keyboard.

9. The computer-readable medium of claim 8, wherein the change is the setting is a user selection of the language for the virtual keyboard.

\* \* \* \* \*